(12) United States Patent
Asumu et al.

(10) Patent No.: US 10,698,500 B2
(45) Date of Patent: Jun. 30, 2020

(54) TOUCH-BASED AND AUDIO-RESPONSIVE USER INTERFACE FOR ELIMINATION OF A QUERY'S COMPONENT TERMS

(71) Applicant: Bank of America Corporation, Charlotte, NC (US)

(72) Inventors: Donatus Asumu, Plano, TX (US); Shane Zatezalo, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/043,430

(22) Filed: Jul. 24, 2018

(65) Prior Publication Data

US 2020/0033954 A1 Jan. 30, 2020

(51) Int. Cl.
| | |
|---|---|
| G06F 17/00 | (2019.01) |
| G06F 3/023 | (2006.01) |
| G06F 3/0488 | (2013.01) |
| G06F 3/16 | (2006.01) |
| G10L 15/22 | (2006.01) |
| G06F 16/332 | (2019.01) |

(52) U.S. Cl.
CPC .......... *G06F 3/0236* (2013.01); *G06F 3/0488* (2013.01); *G06F 3/167* (2013.01); *G06F 16/3329* (2019.01); *G10L 15/22* (2013.01); G10L 2015/225 (2013.01)

(58) Field of Classification Search
CPC ..... G06F 3/167; G06F 16/245; G06F 16/3329
See application file for complete search history.

(56) References Cited

U.S. PATENT DOCUMENTS

| | | | | |
|---|---|---|---|---|
| 7,519,562 | B1* | 4/2009 | Vander Mey | G06Q 30/02 |
| | | | | 705/12 |
| 10,108,704 | B2* | 10/2018 | Awadallah | G06F 16/3331 |
| 2003/0123443 | A1* | 7/2003 | Anwar | G06F 16/951 |
| | | | | 370/392 |
| 2004/0068486 | A1* | 4/2004 | Chidlovskii | G06F 16/9535 |
| 2008/0140643 | A1* | 6/2008 | Ismalon | G06F 16/24578 |
| 2011/0035403 | A1* | 2/2011 | Ismalon | G06F 16/9535 |
| | | | | 707/769 |
| 2014/0258857 | A1* | 9/2014 | Dykstra-Erickson | ...................... |
| | | | | G06F 3/0481 |
| | | | | 715/708 |

(Continued)

*Primary Examiner* — Scott T Baderman
*Assistant Examiner* — Barbara M Level
(74) *Attorney, Agent, or Firm* — Weiss & Arons LLP; Michael A. Springs, Esq.

(57) ABSTRACT

A method for receiving and responding to user input is provided. The user input may be input via a user interface. The method may include receiving input from a user via the user interface. The method may also include transmitting the input to a response determination module. The response determination module may determine a system response to the input. The method may include displaying the system response to the user via the user interface. The method may include receiving an indication from the user that the system response is less than a predetermined threshold level of responsiveness. The method may include dividing the input into component terms and displaying the component terms on the user interface. The method may include enabling the user to eliminate component terms from the input in order to improve responsiveness of the system response, and receiving a selection of eliminated component terms.

18 Claims, 6 Drawing Sheets

(56) References Cited

U.S. PATENT DOCUMENTS

| | | | |
|---|---|---|---|
| 2016/0071517 A1* | 3/2016 | Beaver | G06F 17/2785 704/9 |
| 2017/0359707 A1* | 12/2017 | Diaconu | G10L 15/26 |
| 2018/0096681 A1* | 4/2018 | Ni | G10L 15/1815 |
| 2018/0293273 A1* | 10/2018 | Qian | G06F 3/167 |
| 2018/0329998 A1* | 11/2018 | Thomson | G06F 16/9535 |

* cited by examiner

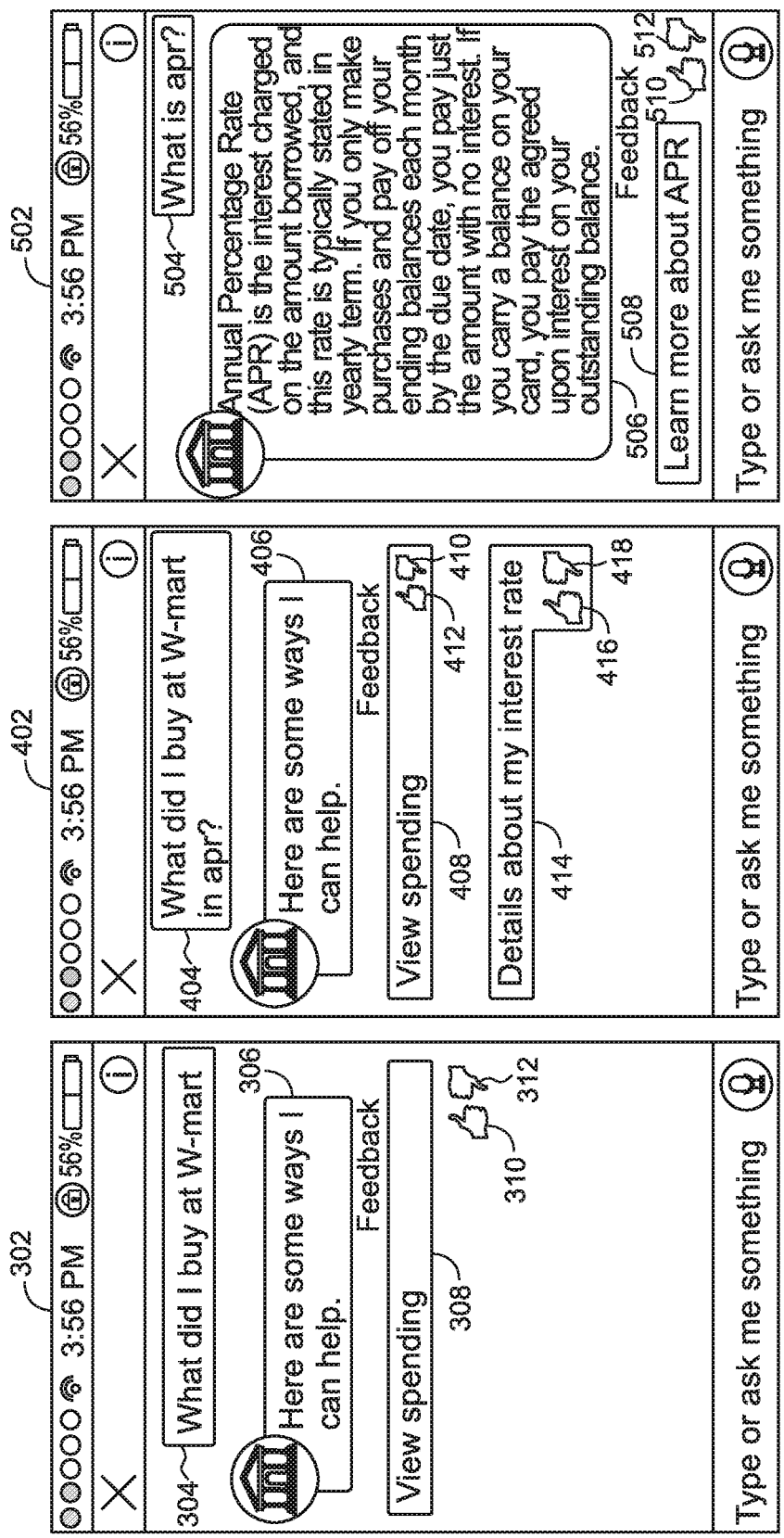

150# TOUCH-BASED AND AUDIO-RESPONSIVE USER INTERFACE FOR ELIMINATION OF A QUERY'S COMPONENT TERMS

FIELD OF TECHNOLOGY

This disclosure relates to user interfaces. More specifically, this disclosure relates to touch-based and audio-responsive user interfaces.

BACKGROUND OF THE DISCLOSURE

Conventionally, a voice or text response system receives textual or verbal queries via a user interface. The voice or text response system may process each query and respond to the query.

Under certain circumstances, the response generated by the voice or text response system may lack responsiveness, and, therefore, not provide the user with adequate assistance. There may be numerous reasons for the lack of responsiveness. One reason may be that one or more words within the query were misspelled. Another reason may be that the system misinterpreted a word in the query. Yet another reason may be an incorrect system-selected meaning of a homonym.

A user may become frustrated when presented with a response that lacks responsiveness. At times, a user viewing the response may understand the misspelling or misinterpretation of the system. Therefore, a user may be in a position to fix the query and/or correct the misunderstanding in order for the system to generate more accurate responses in the future. Therefore, a need exists for a touch-based and audio-responsive user interface. The touch-based and audio-responsive user interface may be used to eliminate one or more misunderstood or misinterpreted component terms of the query.

SUMMARY OF THE DISCLOSURE

A method for receiving and responding to user input is provided. The user input may be input via a touch-based and audio-responsive user interface. The user interface may be a mobile device, such as a smartphone or tablet. The method may include receiving textual and/or verbal input from a user via the touch-based and audio-responsive user interface.

The method may include transmitting the input to a response determination module. The method may include determining a system response to the input at the response determination module. The method may include displaying the system response to the user via the touch-based and audio-responsive user interface. The method may include receiving an indication from the user that the system response is less than a predetermined threshold level of responsiveness.

The method may include dividing the input into component terms. In some embodiments, a component term may be a word. In other embodiments, a component term may be a phrase. In yet other embodiments, a component term may be a sentence.

The method may include displaying the component terms to the user on the touch-based and audio-responsive user interface. The method may include enabling the user to eliminate component terms from the input by touching one or more of the component terms. The elimination of terms may improve the responsiveness of the system response.

The method may include receiving a touch-based elimination selection of one or more component terms from the user via the touch-based and audio-responsive user interface. In some embodiments, upon receiving a touch-based elimination selection of a component term, the component term may appear to be greyed-out. In these embodiments, receiving double-selection of a greyed-out component term may reinstate the component term. A reinstated component term may not appear to be greyed-out. In some embodiments, upon receiving a touch-based elimination selection of a component term, the component term may disappear from the user interface.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 3 shows another illustrative GUI in accordance with principles of the disclosure;

FIG. 4 shows yet another illustrative GUI in accordance with principles of the disclosure;

FIG. 5 shows still another illustrative GUI in accordance with principles of the disclosure;

FIGS. 8A-8E shows a series of GUIs in accordance with principles of the disclosure.

DETAILED DESCRIPTION OF THE DISCLOSURE

Figure 1:
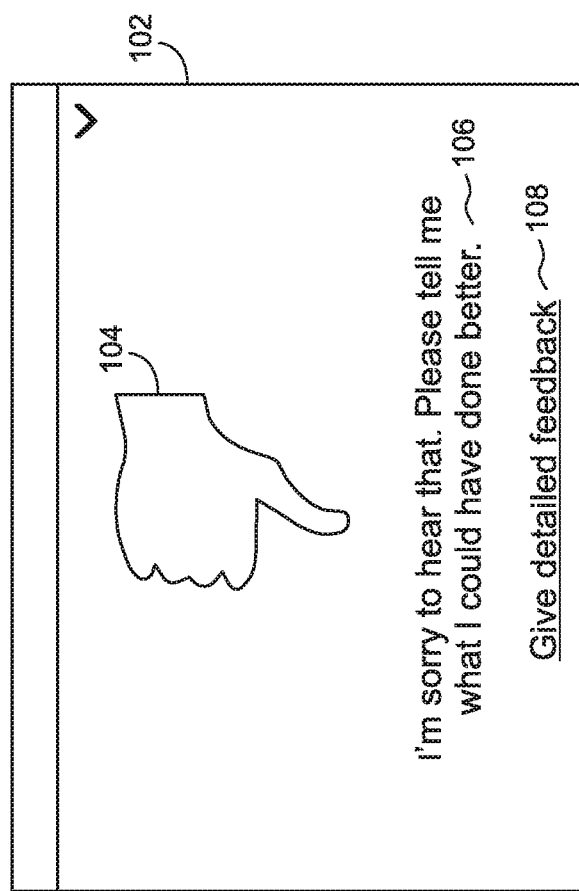
FIG. 1 shows illustrative graphical user interface ("GUI") in accordance with principles of the disclosure.

A system that receives and response to user input is provided. The user input may be input via a user interface. The input may be verbal, textual or a combination of verbal or textual. The system may include the user interface.

The user interface may receive input from a user. The user interface may transmit the input to a response determination module. The response determination module may determine a system response to the input. The response determination module may include various elements of machine learning and/or artificial intelligence in order to determine a system response to the input. In some embodiments, the system response may include one or more recorded video and/or audio responses.

The user interface may transmit the system response to the user. In some embodiments, the user interface may display the system response to the user. In other embodiments the user interface may provide an audio response through speakers (or other suitable device) to the user.

At times, the response determination module may misconstrue one or more component terms of the input. Therefore, the system response presented to the user may not be responsive to the user's input. The user interface may display an input mechanism that enables a user to indicate whether the system response did or did not satisfy the user's input. In some embodiments, the input mechanism may enable selection of a thumbs-up or thumbs-down signal.

The user interface may receive an indication from the user that the system response is less than a predetermined threshold level of helpfulness, usefulness or responsiveness. Upon receipt of such a negative indication, the user interface may divide the input into component terms. The user interface may display the component terms to the user. The user interface may enable the user to eliminate component terms from the input. The elimination of component terms from the input may be in order to improve the helpfulness, usefulness and responsiveness of the system response. It should be appreciated that the elimination of component terms may be at the user's discretion. Therefore, component terms may be eliminated because of various reasons such as misspelling, misconstruing by the system, extraneous words and/or any other suitable reason. The user interface may receive a selection of eliminated component terms. The selection of eliminated terms may be transmitted to the response determination module. The response determination module may use the eliminated terms to enhance its artificial intelligence.

The user interface may re-transmit the input, absent the eliminated component terms, to the response determination module. The response determination module may determine an updated system response to the input. The user interface may transmit the updated system response to the user. The user interface may receive an indication from the user that the updated system response may be ranked at a greater magnitude than the predetermined threshold level of helpfulness, usefulness and responsiveness. The user interface may report to the response determination module that the eliminated component terms may have caused the system response to be indicated as less than the predetermined threshold level of helpfulness, usefulness or responsiveness. The user interface may also report information relating to the user from whom the indication was received.

In some embodiments, the response determination module may use the component terms report in conjunction with data retrieved or received pertaining to the user to update artificial intelligence associated with the response determination module.

At times, there may be an incentive for a user to provide negative indications to the user interface. Therefore, when more than a predetermined number of indications that the system response is less than a predetermined threshold level of helpfulness, usefulness or responsiveness, are received from a specific user, a significance attribute transmitted or reported to the response determination module may be reduced. In some embodiments, the significance attribute may be divided by two, four or any other suitable number. In other embodiments, the significance attribute may be reduced to zero. In some embodiments, the significance attributed to negative indications may be measured by a percentage of total negative indications received compared to total inputs received. In other embodiments, the significance attributed to negative indications may be measured by a percentage of negative indications received within a predetermined most recent time window as compared to total indications received within a most recent predetermined recent time window.

In yet other embodiments, the significance attributed to negative indications may be measured by a percentage of negative indications received within a predetermined most recent amount of negative indications as compared to total indications received within a predetermined most recent amount of inputs.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows illustrative GUI 102. A user may have presented a query or input to a system (not shown). The system may have provided a system response (not shown). A thumbs-up symbol (not shown) and a thumbs-down symbol may have been displayed together with the system response. The user may have been enabled to select the thumbs-up symbol or the thumbs-down symbol as feedback to the system response. Selection of the thumbs-up symbol, by the user, may indicate that the system response satisfies the user's query or input. Selection of the thumbs-down symbol, by the user, may indicate that the system response did not satisfy the user's query or input. Upon receipt of a thumbs-down selection from the user, the user may be presented with GUI 102.

GUI 102 may display thumbs-down symbol 104. The system may apologize to the user for not providing a response with sufficient responsiveness, as shown at 106. GUI 102 may include hyperlink 108. Hyperlink 108 may enable a user to provide detailed feedback relating to the system response.

Figure 2:
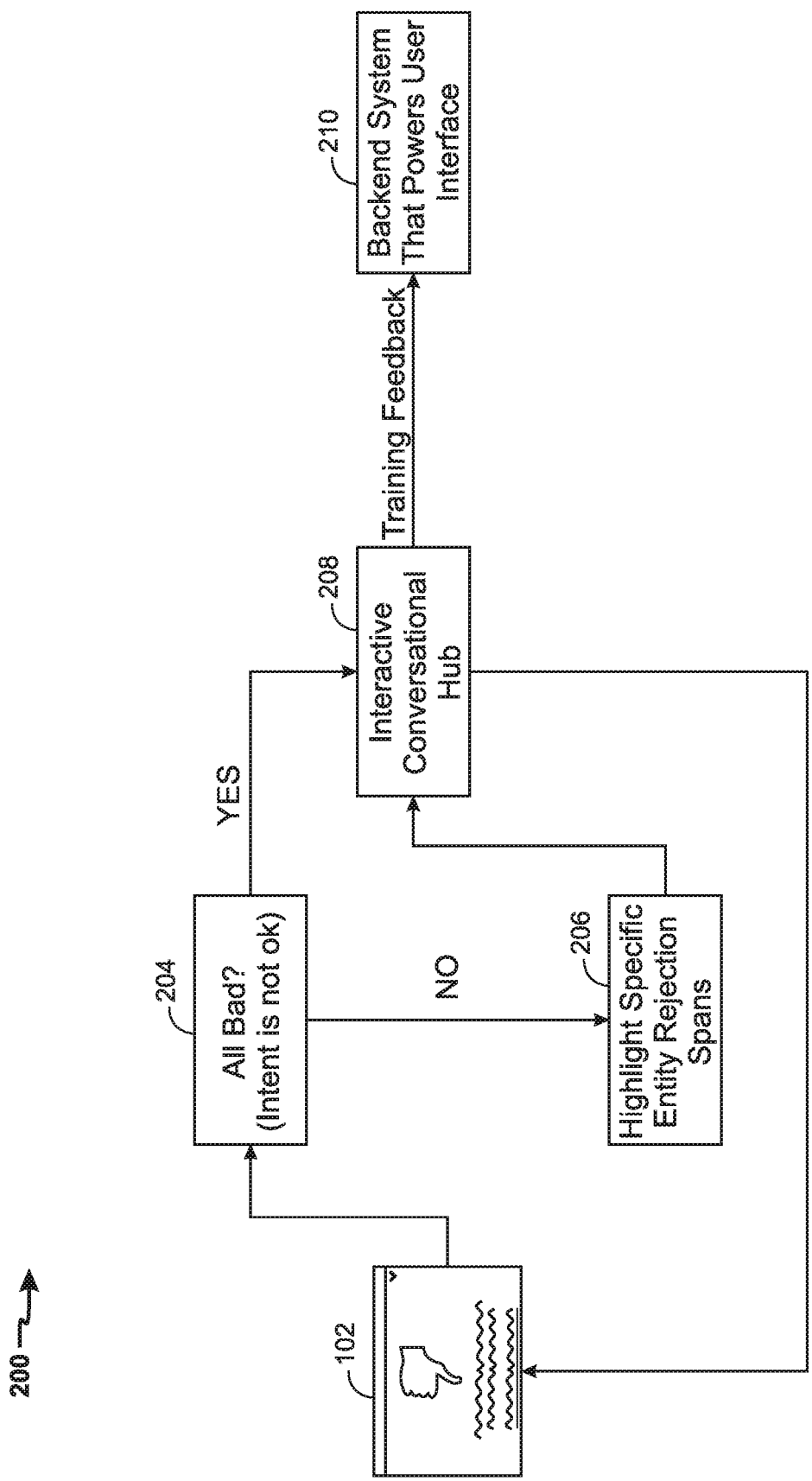
FIG. 2 shows an illustrative flow chart in accordance with principles of the disclosure.

FIG. 2 shows illustrative flow chart 200. GUI 102 may have been presented to a user, as described in connection with FIG. 1. Upon selection of hyperlink 108 (shown in FIG. 1), in some embodiments, the user may be asked, by the system, whether the intent of the query or input, as determined by the system, was entirely or partially misconstrued, as shown at 204. In these embodiments, if the user selects that the entirety of the query or input was misconstrued (the intent of the query or input is not in line with the user's intent), the query or input and the fact that the entirety of the query or input was misconstrued may be transmitted to interactive conversational hub 208. At interactive conversational hub 208, the query or input, the system response and the fact that the entirety of the query or input was misconstrued may be processed by an intelligence development module and/or team. Upon processing, interactive conversational hub 208 may provide training feedback, relating to the misconstrued query or input, to backend system that powers the user interface 210. The user interface may be the system or graphical interface that communicates with the user.

In these embodiments, if the user selection indicates that the entirety of the query or input was not completely misconstrued, the system may direct a user to an additional GUI. In some embodiments, directly upon selection of a thumbs-down symbol or upon selection of hyperlink 108, the user may be directed to the additional GUI. The additional GUI may enable the user to highlight, select or eliminate specific entity rejections spans, as shown at 206. The additional GUI may enable the user to highlight, select or eliminate terms that the user determined to have misled the underlying system. The highlighted, selected or eliminated terms, the query or input and/or the fact that the system misconstrued the query or input may be transmitted to interactive conversational hub 208 for further processing, as described above.

FIG. 3 shows GUI 302. A user may input to the system "What did I buy at W-mart", as shown at 304. The system may respond "Here are some ways I can help", as shown at 306. The system may enable the user to select "View spending" as shown at 308. Selection of "View spending" may direct the user to a GUI that allows the user to view his spending. If selection of "View spending" is responsive to the user, the user may select thumbs-up symbol 310. If selection of "View spending" is not responsive to the user, the user may select thumbs-down symbol 312. If the user selects thumbs-down symbol 312, the user may be directed to GUI 102, as shown in FIGS. 1 and 2.

FIG. 4 shows GUI 402. A user may input to the system "What did I buy at W-mart in apr?" as shown at 404. The system may respond "Here are some ways I can help", as shown at 406. The system may enable the user to select "View spending", as shown at 408. Thumbs-up symbol 412 and thumbs-down symbol 410 may be displayed next to the "View spending" link.

The system may also enable the user to select "Details about my interest rate", as shown at 414. Thumbs-up symbol 416 and thumbs-down symbol 418 may be displayed next to the "details about my interest rate" link. It should be appreciated that the system may have misconstrued the word "apr" to mean the acronym of annual percentage rate as opposed to April. Therefore, the system may have presented these two options to the user.

FIG. 5 shows GUI 502. A user may input to the system "What is apr?" as shown at 504. The system response may be "Annual Percentage Rate (APR) is the interest charged on the amount borrowed, and this rate is typically stated in yearly term. If you only make purchases and pay off your ending balances each month by the due date, you pay just the amount with no interest. If you carry a balance on your card, you pay the agreed upon interest on your outstanding balance." as shown at 506. The user may also be presented with a hyperlink that allows the user to learn more about APR, as shown at 508. If the user was satisfied with the system response, the user may select thumbs-up symbol 510. If the user was not satisfied with the system response, the user may select thumbs-down symbol 512. If the user selects thumbs-down symbol 512, the user may be directed to GUI 102, as shown in FIGS. 1 and 2.

Figure 6:
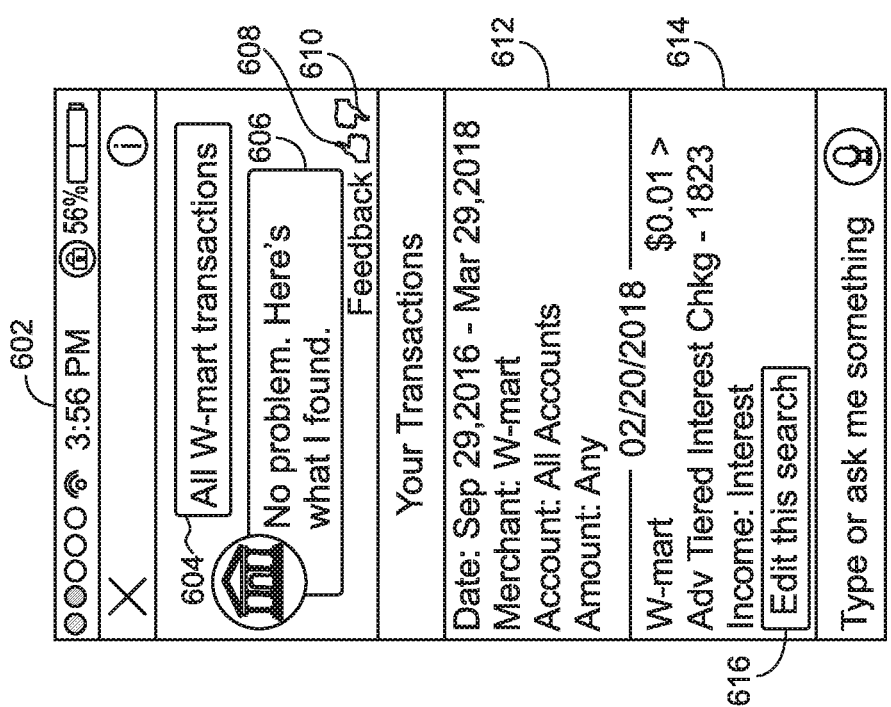
FIG. 6 shows yet another illustrative GUI in accordance with principles of the disclosure.

FIG. 6 shows GUI 602. A user may input to the system "All W-mart transactions" as shown at 604. The system response may be "No problem. Here's what I found." As shown at 606. The transaction criteria may be displayed as shown at 612. The transactions may be displayed below the transaction criteria as shown at 614. The user may be able to edit the search criteria by selecting edit this search button 616. If the user was satisfied with the system response, the user may select thumbs-up symbol 608. If the user was not satisfied with the system response, the user may select thumbs-down symbol 610. If the user selects thumbs-down symbol 610, the user may be directed to GUI 102, as shown in FIGS. 1 and 2.

Figure 7:
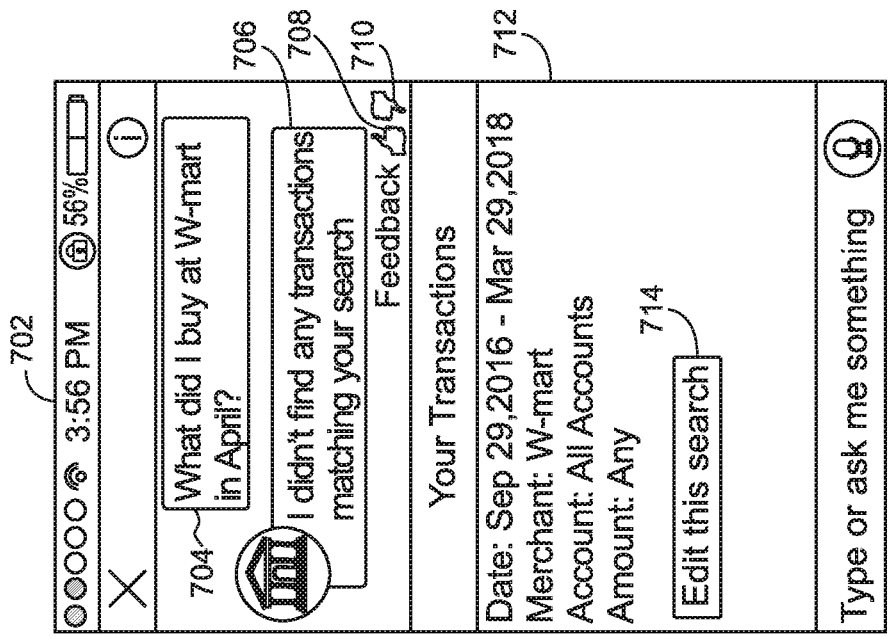
FIG. 7 shows still another illustrative GUI in accordance with principles of the disclosure.

FIG. 7 shows GUI 702. A user may input to the system "What did I buy at W-mart in April?" as shown at 704. The system may respond "I didn't find any transactions matching your search", as shown at 706. The search criteria may be shown at 712. A user may be able to edit the search criteria by selecting edit this search button 714. If the user was satisfied with the system response, the user may select thumbs-up symbol 708. If the user was not satisfied with the system response, the user may select thumbs-down symbol 710. If the user selects thumbs-down symbol 710, the user may be directed to GUI 102, as shown in FIGS. 1 and 2.

Figures 8A, 8B, 8C:
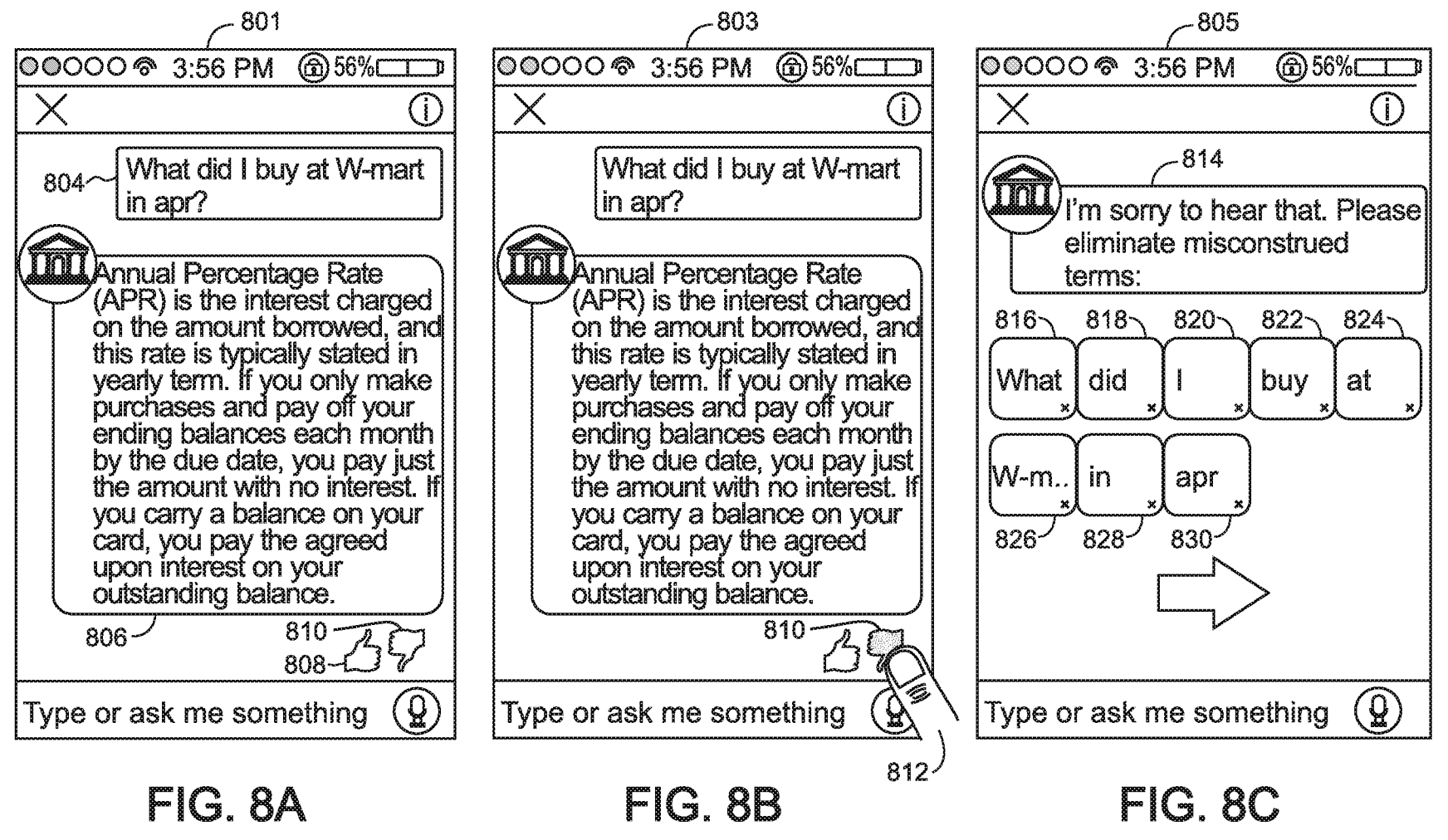
Figure 8E:
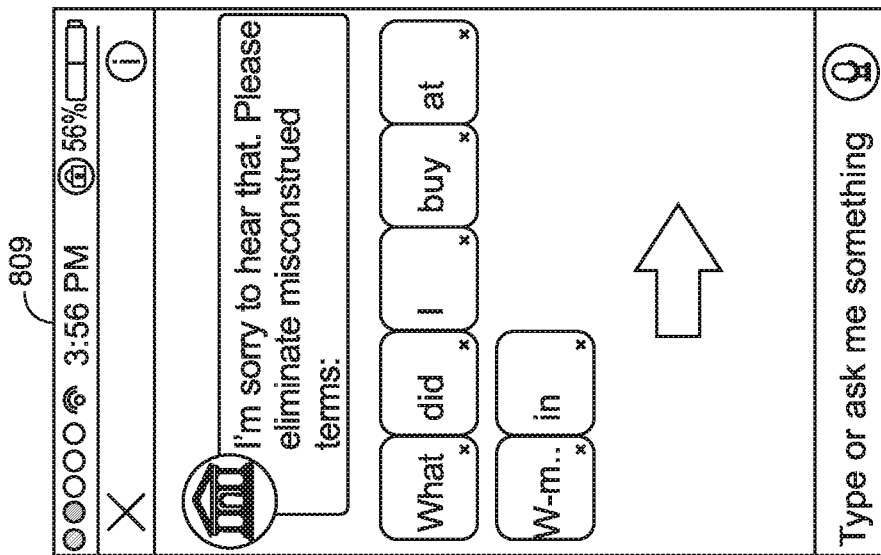

FIG. 8A-8E shows a series of GUIs 801, 803, 805, 807 and 809. FIG. 8A shows GUI 801. A user may input to the system "What did I buy at W-mart in apr?" as shown at 804. The system may respond "Annual Percentage Rate (APR) is the interest charged on the amount borrowed, and this rate is typically stated in yearly term. If you only make purchases and pay off your ending balances each month by the due date, you pay just the amount with no interest. If you carry a balance on your card, you pay the agreed upon interest on your outstanding balance." as shown at 806. If the user was satisfied with the system response, the user may select thumbs-up symbol 808. If the user was not satisfied with the system response, the user may select thumbs-down symbol 810.

GUI 803, shown at FIG. 8B, shows the user (812) touching, and thereby selecting thumbs-down symbol 810.

GUI 805, shown at FIG. 8C, shows the system response to the user's selection of thumbs-down symbol 810. The system response may include "I'm sorry to hear that. Please select misconstrued terms:" as shown at 814. The query may be displayed and divided into component terms, as shown at 816, 818, 820, 822, 824, 826, 828 and 830.

Figure 8D:
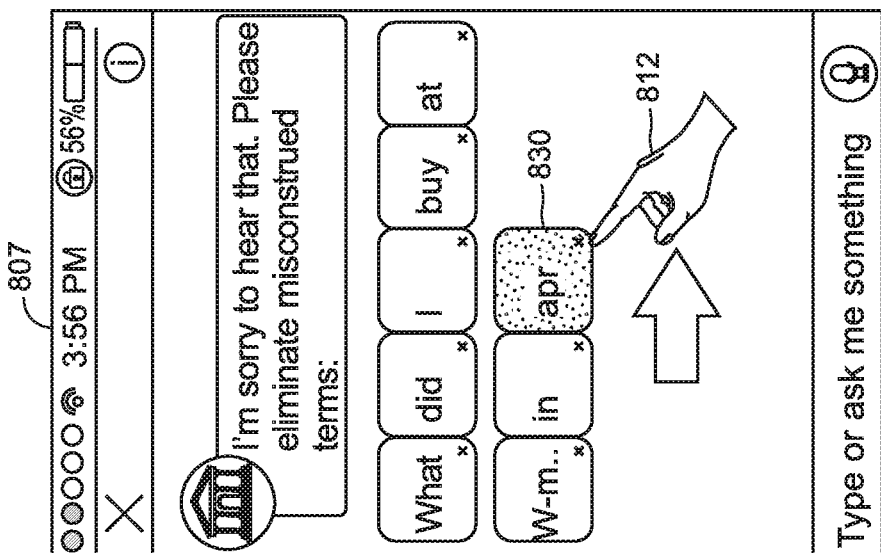

GUI 807, shown at FIG. 8D, shows the user (812) select the term "apr", as shown at 830. The user may have selected to term "apr" because the user may have determined that the system misconstrued the term "apr" for annual percentage rate as opposed to the intended meaning of the acronym for April.

GUI 809, as shown at FIG. 8E shows that the selected term "apr" was eliminated from the query. At times, the query may be retransmitted to the system absent the eliminated words. The re-transmission of the query may prompt an updated system response, which may be a more accurate system response than the initial system response.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and apparatus for a touch-based and audio-responsive user interface for elimination of a query's component terms are provided. Persons skilled in the art will appreciate that the present invention can be practiced by other than the described embodiments, which are presented for purposes of illustration rather than of limitation, and that the present invention is limited only by the claims that follow.

What is claimed is:

1. A system that receives and responds to user input, the user input being input via a mobile device, the system comprising:
the mobile device, said mobile device operable to:
receive input from a user;
transmit the input to a response determination module, said response determination module operable to determine a system response to the input;
transmit the system response to the user;
receive an indication from the user that the system response is less than a predetermined threshold level of helpfulness, usefulness or responsiveness;
divide the input into component terms;
display the component terms to the user;
enable the user to eliminate component terms from the input in order to improve helpfulness, usefulness or responsiveness of the system response; and
receive a selection of eliminated component terms from the user;
wherein, in order to prevent the user from providing false negative indications, when more than a predetermined number of indications that the system response is less than the predetermined threshold level of helpfulness, usefulness or responsiveness, are received from the user, a significance attribute, said significance attribute that indicates the significance to be attributed by the response determination module to the selection of eliminated component terms, said significance attribute is divided by two.

2. The system of claim 1, wherein the mobile device is further operable to:
re-transmit the input absent the eliminated component terms to the response determination module, said response determination module further operable to determine an updated system response to the input;
transmit the updated system response to the user;
receive an indication from the user that the updated system response is greater than the predetermined threshold level of helpfulness, usefulness or responsiveness; and
report to the response determination module that, as determined by the user, the eliminated component terms caused the system response to be indicated, by the user, as less than the predetermined threshold level of helpfulness, usefulness or responsiveness.

3. The system of claim 2, wherein the response determination module uses the report that the eliminated component terms caused the system response to be indicated as less than the predetermined threshold level of helpfulness, usefulness or responsiveness in conjunction with data retrieved pertaining to the user to update artificial intelligence associated with the response determination module.

4. The system of claim 1, wherein, when an amount of indications, received from the user, divided by a total amount of inputs received from the user, is greater than a predetermined percentage, a significance attribute reported to the response determination module is reduced, said indications indicating that the system response is less than a predetermined threshold level of helpfulness, usefulness or responsiveness.

5. The system of claim 1, wherein, when an amount of indications, received from the user, divided by a predetermined, most-recent amount of inputs received from the user, is greater than a predetermined percentage, a significance attribute reported to the response determination module is reduced, said indications indicating that the system response is less than a predetermined threshold level of helpfulness, usefulness or responsiveness.

6. The system of claim 1, wherein the input received from the user is textual input.

7. The system of claim 1, wherein the input received from the user is verbal input.

8. The system of claim 1, wherein the input received from the user is a combination of textual and verbal input.

9. A method for receiving and responding to user input, the user input being input via a user interface, the method comprising:
receiving input from a user via the user interface;
transmitting the input to a response determination module;
determining a system response to the input at the response determination module;
displaying the system response to the user via the user interface;
receiving an indication from the user that the system response is less than a predetermined threshold level of responsiveness;
dividing the input into component terms;
displaying, on the user interface, the component terms to the user;
enabling the user to eliminate component terms from the input in order to improve responsiveness of the system response; and
receiving a selection of eliminated component terms from the user via the user interface;
wherein, in order to prevent the user from providing false negative indications, when more than a predetermined number of indications that the system response is less than the predetermined threshold level of responsiveness, are received from the user, a significance attribute, said significance attribute that indicates the significance to be attributed by the response determination module to the selection of eliminated component terms, said significance attribute is divided by two.

10. The method of claim 9, further comprising:
re-transmitting the input absent the eliminated component terms to the response determination module;
determining an updated system response at the response determination module;
transmitting the updated system response to the user;
receiving an indication from the user that the updated system response is greater than the predetermined threshold level of responsiveness; and
reporting to the response determination module that, as determined by the user, the eliminated component terms caused the system response to be indicated, by the user, as less than the predetermined threshold level of responsiveness.

11. The method of claim 10, wherein the response determination module uses the eliminated component terms in conjunction with data retrieved pertaining to the user to update artificial intelligence associated with the response determination module.

12. The method of claim 9, wherein, when an amount of negative indications, received from the user, divided by a total amount of inputs, received from the user, is greater than a predetermined percentage, a significance attribute reported to the response determination module is reduced.

13. The method of claim 9, wherein, when an amount of negative indications, received from the user, divided by a predetermined, most-recent amount of inputs received from the user, is greater than a predetermined percentage, a significance attribute reported to the response determination module is reduced.

14. The method of claim 9, wherein the input received from the user is textual input.

15. The method of claim 9, wherein the input received from the user is verbal input.

16. The method of claim 9, wherein the input received from the user is a combination of textual and verbal input.

17. A method for receiving and responding to user input, the user input being input via a touch-based and audio-responsive user interface, the method comprising:
   receiving textual and/or verbal input from a user via the touch-based and audio-responsive user interface;
   transmitting the input to a response determination module;
   determining a system response to the input at the response determination module;
   displaying the system response to the user via the touch-based and audio-responsive user interface;
   receiving an indication from the user that the system response is less than a predetermined threshold level of responsiveness;
   dividing the input into component terms;
   displaying, on the touch-based and audio-responsive user interface, the component terms to the user;
   enabling the user to eliminate component terms from the input, in order to improve responsiveness of the system response, by touching one or more of the component terms; and
   receiving a touch-based elimination selection of one or more component terms from the user via the touch-based and audio-responsive user interface;
   wherein, in order to prevent the user from providing false negative indications, when more than a predetermined number of indications that the system response is less than the predetermined threshold level of responsiveness, are received from the user, a significance attribute, said significance attribute that indicates the significance to be attributed by the response determination module to the selection of eliminated component terms, said significance attribute is divided by two.

18. The method of claim 17, wherein the user interface is a mobile device.

* * * * *